United States Patent [19]

Liu

[11] Patent Number: 4,906,317

[45] Date of Patent: Mar. 6, 1990

[54] INSTANT ADHESIVE COMPOSITION AND BONDING METHOD EMPLOYING SAME

[75] Inventor: Ju-Chao Liu, Newington, Conn.

[73] Assignee: Loctite Corporation, Newington, Conn.

[21] Appl. No.: 749,342

[22] Filed: Jun. 27, 1985

Related U.S. Application Data

[63] Continuation of Ser. No. 655,041, Nov. 10, 1983, abandoned.

[51] Int. Cl.$^4$ ................................................. C09J 5/02
[52] U.S. Cl. ............................. 156/307.3; 156/331.2; 428/514; 428/522; 526/194; 526/204; 526/298
[58] Field of Search .......................... 156/331.2, 307.3; 428/514, 522; 526/194, 298, 204

[56] References Cited

U.S. PATENT DOCUMENTS 4,171,416 10/1979 Motegi et al. ...................... 428/514

FOREIGN PATENT DOCUMENTS 2069512 8/1981 United Kingdom ................ 526/204

OTHER PUBLICATIONS

"Chemically Modified Surfaces in Catalysis and Electrocatalysis", ACS Symposium Series 192, J. Miller, ed., pp. 281-291, (1982).
"Silacrowns—Product Data Sheet", Silacrown Compounds Register and Review, Petratch Systems, Inc.

*Primary Examiner*—John J. Gallagher
*Attorney, Agent, or Firm*—Vidas & Arrett

[57] ABSTRACT

Cyanoacrylate adhesive compositions which employ silacrown compounds as additives give substantially reduced fixture and cure times on de-activating substrates such as wood. The silacrown compounds are preferably employed at levels of about 0.1-5% by weight of the composition.

11 Claims, No Drawings

INSTANT ADHESIVE COMPOSITION AND BONDING METHOD EMPLOYING SAME

This is a continuation of application Ser. No. 550,411 filed Nov. 10, 1983, now abandoned.

BACKGROUND OF THE INVENTION

In DE-OS No. 2,816,836, dated Oct. 26, 1978 there are described cyanoacrylate adhesive compositions which employ crown ethers as polymerization accelerators. Such compositions are useful for bonding acidic surfaces such as wood which inhibit cyanoacrylate polymerization.

Crown ethers, however, are known to be very toxic, the reported effects of exposure including damage to the central nervous system and testicular atrophy. Leong, B. K. J., Chem. Eng. News, 53, 5(1975). Furthermore, such accelerators are reportedly very difficult to synthesize, supplying the desired product in only low yields because of the tendency to produce intermolecular linkages. Accordingly, there is a need for alternative cyanoacrylate accelerators suitable for wood bonding applicators.

In U.S. Pat. No. 4,170,585, there are described cyanoacrylate compositions in which certain polyethylene glycols or poly(ethyleneoxy) functional surfactants act as wood bonding accelerators. Such compounds, however, have the reported disadvantage that they tend to contain water and other difficult to remove substances which spontaneously initiate polymerization of the cyanoacrylate monomer.

U.S. Pat. No. 4,377,490 discloses mixtures of aromatic and aliphatic polyols and polyethers said to improve initial strength of cyanoacrylate wood bonding products.

U.S. Pat. No. 4,386,193 discloses certain 3 or 4 arm polyol podand compounds as alternatives to crown ether accelerators.

Japan Kokai Tokkyo Koho 82-70171, suggests the use of certain polyorgano siloxane compounds which include polyether substituents as additives for wood bonding cyanoacrylate compositions.

Chem. Abstracts, 97 145913n reports the use of a hydroxy-terminated poly(dimethylsiloxane) in fast bonding cyanoacrylate compositions.

DE-OS 3,006,071 discloses certain furan derivatives as co-accelerators with crown ethers in cyanoacrylate compositions.

SUMMARY OF THE INVENTION

The present invention is a new cyanoacrylate composition for bonding wood and other de-activating surfaces such as leather, ceramic, plastics and metals with chromate treated or acidic oxide surfaces. The inventive compositions are standard cyanoacrylate adhesive formulations to which have been added accelerator compounds known as silacrowns. The silacrown compounds are preferably employed at levels between about 0.1% and 5% by weight of the composition.

The silacrown accelerators have significantly lower reported acute toxicity than the crown ether compounds of the prior art. Silacrown compounds are commercially available and are reportedly readily synthesized in good yield.

DETAILED DESCRIPTION OF THE INVENTION

The α-cyanoacrylate-type adhesive composition of this invention as described above contains an α-cyanoacrylate monomer of the formula:

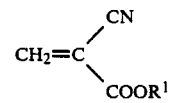

wherein $R^1$ represents a straight chain or branched chain alkyl group having 1 to 12 carbon atoms (which may be substituted with a substituent such as a halogen atom or an alkoxy group) a straight chain or branched chain alkenyl group having 2 to 12 carbon atoms, a straight chain or branched chain alkynyl group having 2 to 12 carbon atoms, a cycloalkyl group, an aralkyl group or an aryl group. Specific examples of the groups for $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group.

A single α-cyanoacrylate monomer or a mixture of two or more of these α-cyanoacrylate monomers can be used. Generally, the above α-cyanoacrylate monomer alone is not sufficient as an adhesive, and the components set forth below are sometimes added.

(1) An anionic polymerization inhibitor
(2) A radical polymerization inhibitor
(3) A thickener
(4) Special additives such as plasticizers and heat stabilizers
(5) Perfumes, dyes, pigments, etc.

A suitable amount of the α-cyanoacrylate monomer present in the adhesive composition is about 80 to 99.9% by weight preferably 90 to 99.9% by weight, based on the total weight of the adhesive composition.

An anionic polymerization inhibitor is added to the α-cyanoacrylate-type adhesive composition, e.g., in an amount of about 1 to 1000 ppm based on the total weight of the adhesive composition, to increase the stability of the adhesive composition during storage, and examples of known inhibitors are sulfur dioxide, aromatic sulfonic acids, aliphatic sulfonic acids, sultones, and carbon dioxide.

Suitable examples of radical polymerization inhibitors include, for example, hydroquinone and hydroquinone monomethyl ether. A radical polymerization inhibitor is added, e.g., in amount of about 1 to 5000 ppm based on the total weight of the adhesive composition, for the purpose of capturing radicals which are formed by light during storage.

A thickener is added to increase the viscosity of the α-cyanoacrylate-type adhesive composition. The α-cyanoacrylate monomer generally has a low viscosity of about several centipoises, and therefore, the adhesive penetrates into porous materials such as wood and leather or adherends having a rough surface. Thus, good adhesion strengths are difficult to obtain. Various polymers can be used as thickeners, and examples include poly(methyl methacrylate), methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition.

As disclosed in the copending application of Alan Litke, Ser. No. 528,275, filed Aug. 31, 1983, now U.S. Pat. No. 4,477,607, certain fumed silica fillers treated with polydialkylsiloxanes or trialkoxyalkylsilanes may also be usefully employed as cyanoacrylate thickeners.

The plasticizers, perfumes, dyes, pigments, etc., may be added depending on use purposes in amounts which do not adversely affect the stability of the α-cyanoacrylate monomer. The use of such additives is within the skill of those practicing in the cyanoacrylate adhesive art and need not be detailed herein.

The silacrown accelerators useful in the inventive compositions have been reported by Arkles, et al., in Organometalics, 2 454-457 (1983) and in "Chemically Modified Surfaces in Catalysis and Electrocatalysis," ACS Symposium Series 192, J. Miller, ed., pgs. 281-292, ACS (1982), the disclosures of which are incorporated herein by reference. They may be represented by the following general structure:

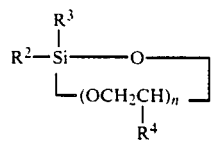

where $R^2$ and $R^3$ are organo groups which do not themselves cause polymerization of the cyanoacrylate monomer, $R^4$ is H or $CH_3$ and n is an integer. Examples of suitable $R^2$ and $R^3$ groups are $R^1$ groups, alkoxy groups such as methoxy, and aryloxy groups such as phenoxy. The $R^2$ and $R^3$ groups may contain halogen or other substituents, an example being trifluoropropyl. Groups not suitable as $R^2$ and $R^3$ groups are basic groups such as amino, substituted amino and alkylamino.

Specific examples of silacrown compounds useful in the inventive compositions include dimethylsila-11-crown-4(I); dimethylsila-14-crown-5(II); and dimethylsila-17-crown-6(III).

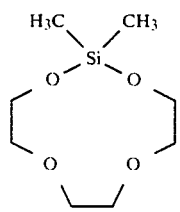

I

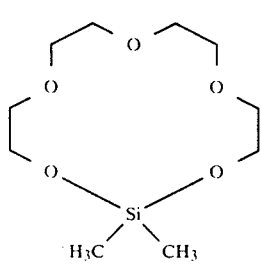

II

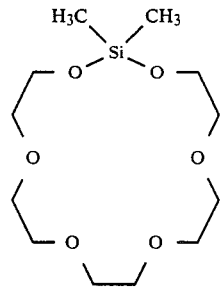

III

The name indicates the substituents on the silicon atom, the number of members in the ring and the number of oxygens.

As reported in the aforementioned Arkles et al. papers, the silacrowns may be readily prepared by transesterification of alkoxysilanes with polyethylene glycols. Certain of the compounds are also sold by Petrarch Systems Research Laboratories, Bristol, PA.

The following examples serve to illustrate the invention.

EXAMPLES 1-5

Cyanoacrylate compositions were prepared containing 6% poly(methyl methacrylate) thickener, a silacrown compound as indicated in Table I, and the balance ethyl cyanoacrylate stabilized with 1000 ppm hydroquinone, 10 ppm methane sulfonic acid and 10 ppm $SO_2$. The compositions were applied between balsa wood strips and fixture time, measured as time required for the composition to gel sufficiently to cause the two unloaded substrates to move as a unit when rotary pressure is applied to one of the substrates, was determined for each composition. The results given in Table I demonstrate the significantly reduced fixture time for the inventive compositions of Examples 1-4 over that of a blank, Example 5.

TABLE I

| Example | Additive | % Concentration | Fixture Time(sec) |
|---|---|---|---|
| 1 | dimethylsila-14-crown-5 | 0.5 | 12 |
| 2 | dimethylsila-11-crown-4 | 0.5 | 12 |
| 3 | dimethylsila-17-crown-6 | 0.5 | 6 |
| 4 | dimethylsila-17-crown-6 | 1.0 | 3 |
| 5 | none | — | 45 |

EXAMPLE 6

The composition of Example 4 was applied between Balsa, Birch and Oak strips. Cure times, determined as time required to give a substrate failure in order to break the bond, were compared to that of the silacrown free composition of Example 5. Results are given in Table II.

TABLE II

| | Cure Time (sec) | |
|---|---|---|
| Wood Type | % dimethylsila-17-crown-6 | no additive |
| Balsa | 15 | 90 |
| Birch | 30 | 360 |
| Oak | 300 | 3600 |

The sensitivity of cyanoacrylate monomers creates particular problems in the selection of property modifying additives which will not reduce storage stability of the composition to unacceptable levels. The inventive compositions show some minor reduction in shelf life compared to silacrown free compositions, but display storage stability which is satisfactory for the general commercial purposes to which cyanoacrylate adhesives are used. Example 7 demonstrates that the use of silacrown accelerators does not produce an unsatisfactorily reduction in shelf life.

EXAMPLE 7

Samples of the inventive composition of Example 4 and the control composition of Example 5, in closed Pyrex containers, were placed in a 55° C. oven until gellation was observed. The control sample lasted 55 days and the inventive composition lasted 50 days.

The reduced observed toxicity of silacrowns in comparison to crown-ethers may be related to the hydrolytic instability of the Si—O—C linkage. Thus, while the silacrown ring is stable in the cyanoacrylate composition, it will open up in biological environments, reducing both acute and chronic risk.

I claim:

1. In a method of bonding a pair of substrates comprising applying a cyanoacrylate adhesive to at least one of the substrates and joining the substrates for sufficient time to permit the adhesive to fixture, the improvement comprising that said adhesive includes a silacrown compound additive.

2. The method of claim 1 wherein at least one of said substrates is selected from wood, leather, ceramic, plastic and metals with chromate-treated or acidic oxide surfaces.

3. A cyanoacrylate adhesive composition comprising a cyanoacrylate ester and an anionic polymerization inhibitor, the composition characterized in that a silacrown compound has been added to the composition in an amount effective to accelerate polymerization of the composition on a wood substrate, and the composition, after addition of said silacrown compound, is storage stable.

4. The composition of claim 1 wherein the cyanoacrylate adhesive composition contains a monomer of the formula:

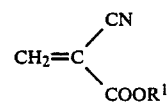

wherein $R^1$ represents a substituted or unsubstituted straight chain or branched chain alkyl group having 1 to 12 carbon atoms, a straight chain or branched chain alkenyl group having 2 to 12 carbon atoms, a straight chain or branched chain alkynyl group having 2 to 12 carbon atoms, a cycloalkyl group, an aralkyl group or an aryl group.

5. The composition of claim 4 wherein said silacrown compound is present in the range of 0.1-5% by weight.

6. The composition of claim 4 wherein said silacrown compound is represented by the formula:

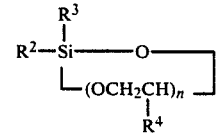

wherein $R^2$ and $R^3$ are organo groups which do not cause polymerization of the cyanoacrylate monomer, $R^4$ is H or $CH_3$ and n is an integer.

7. The composition of claim 6 wherein $R^2$ and $R^3$ are selected from $R^1$, alkoxy, and aryloxy groups.

8. The composition of claim 7 wherein the silacrown additive is selected from dimethyl-11-crown-4; dimethyl-14-crown-5; and dimethylsila-17-crown-6.

9. The composition of claim 2 further comprising a free radical polymerization inhibitor.

10. The composition of claim 2 further comprising a thickener.

11. The composition of claim 4 wherein $R^1$ is selected from a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group.

* * * * *